Aug. 18, 1953 M. L. GAYFORD ET AL 2,649,506

NEGATIVE FEEDBACK APPLIED TO MAGNETIC RECORDING

Filed Jan. 14, 1949

Inventors
MICHAEL LAWRENCE GAYFORD
WILLIAM DONALD CRAGG
By R P Morris
Attorney

Patented Aug. 18, 1953

2,649,506

UNITED STATES PATENT OFFICE 2,649,506

NEGATIVE FEEDBACK APPLIED TO MAGNETIC RECORDING

Michael Lawrence Gayford and William Donald Cragg, London, England, assignors to International Standard Electric Corporation, New York, N. Y., a corporation of Delaware Application January 14, 1949, Serial No. 70,832
In Great Britain January 16, 1948

11 Claims. (Cl. 179—100.2)

This invention relates to improvements in magnetic sound recording systems.

Due to the inherently non-linear magnetic properties of magnetic recording media, distortion products are generated. In spite of the use of high frequency biassing, the most recent systems still fail to produce a perfect reproduction of the input signal. There is introduced about 3% harmonic distortion for maximum modulation at all frequencies, and very little less at lower modulation levels.

The object of the invention is to reduce substantially or eliminate the inherent distortion in magnetic sound recording systems.

The main feature of the invention is magnetic sound recording equipment comprising a recording head to which intelligence carrying signals are fed, means by which negative feedback signals corresponding to the said intelligence signals as distorted by the recording medium are obtained and means for feeding the said negative feedback signals together with said intelligence signals to the recording head whereby inherent distortion due to non-linearity in the magnetisation of the said medium is substantially reduced or eliminated.

Figures 1, 2, 3, 4:
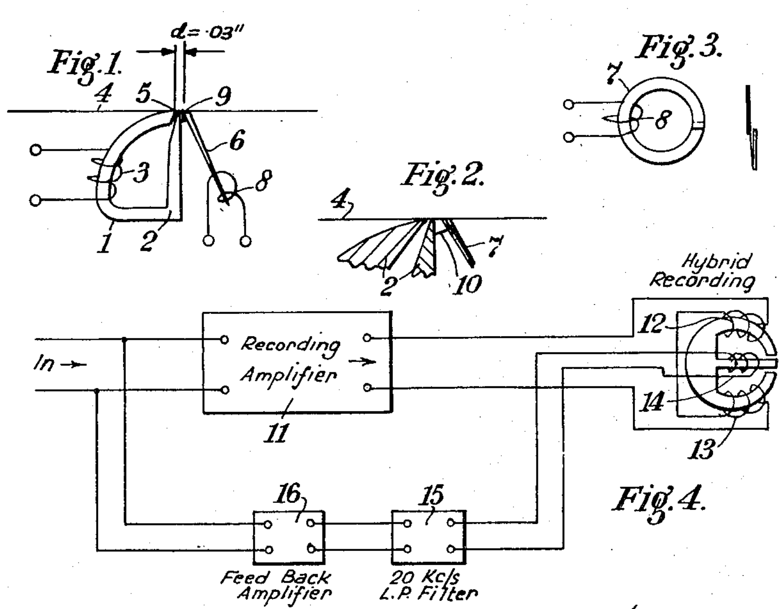

The invention will now be particularly described with reference to certain embodiments thereof shown in the accompanying drawings, in which:

Fig. 1 shows a diagrammatic view of the recording and pick-up heads incorporated in magnetic sound recording equipment according to a first embodiment of the invention whilst Fig. 2 gives a more detailed sectional view of part of the two heads and Fig. 3 provides a diagrammatic plan and elevation of the pick-up head.

Figure 5:
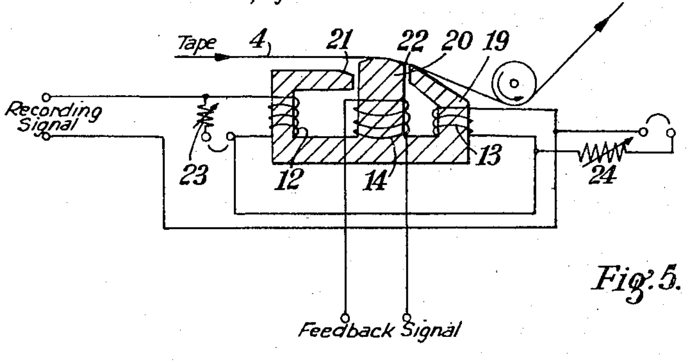

Figs. 4 and 5 refer to a second embodiment of the invention in which a hybrid recording head is use, Fig. 5 showing in more detail the circuit arrangement for the head itself.

Figure 6:
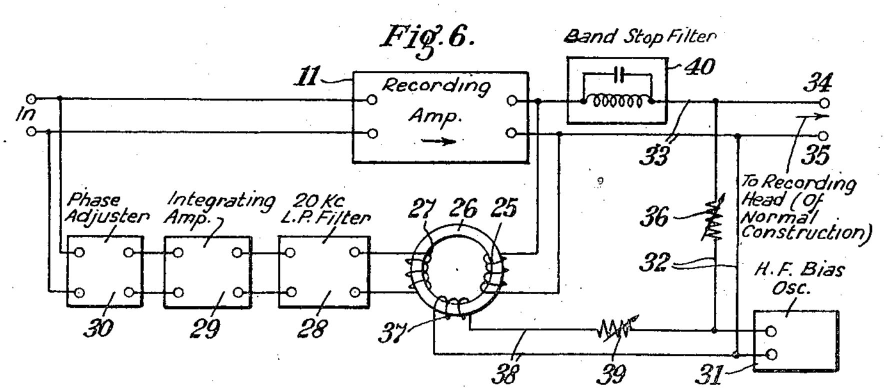

Fig. 6 gives in schematic form a third embodiment of the invention in which a transformer having a core of the same material as the magnetisable recording medium is used in the feedback path. This equipment as shown in the circuit of Fig. 6 has an H. F. bias arrangement.

The negative feed-back is fed to a suitable point in the recording amplifier chain and is a signal taken from the output end of the amplifier chain which has undergone distortion equivalent to that inherent in the magnetic recording process.

The feed-back signal can be derived from the signal actually recorded on the recording medium or alternatively can be a signal from the amplifier taken through a device designed to simulate the distortion introduced in the recording process.

In accordance with the first embodiment of the invention shown in Fig. 1, the signal is recorded on the recording medium 4 in the usual way, it is picked from the recording medium 4 as it leaves the vicinity of the recording head 1 by means of a pick up head 9 and then applied through a phase correcting network 11a to a point in the recording amplifier 11. The phase correcting network 11a will have to advance the phase of the signal at any frequency by an amount which exactly compensates for the phase delay which occurs due to the passing of the recording medium from the magnetic gap 5 of the recording head to that of the pick-up head 9.

The phase retardation of the signal due to a distance *d* between the heads will increase with frequency in a linear manner. A lattice network can give a phase advancing characteristic substantially linear with frequency, which can be arranged to compensate for the delay due to the distance between the two heads.

In Fig. 1 a recording head 1 has a core 2 and an energising winding 3.

A recording medium in the form of a tape or wire 4, of magnetic material, passes a gap 5 in core 2 from left to right of the figure.

The pick-up head 6 has a core 7 consisting of a single lamination and carries a winding 8. The gap 9 between the ends of core 7 is placed near to the gap 5 of the recording head and is actually of the order .03 inch away from it.

Fig. 2 in which the same numerals as those used in Fig. 1 are used to denote corresponding items, shows the relative positions of recording and pick-up gaps to a larger scale and it will be seen that the two cores 2 and 7 are separated by a nonmagnetic spacer 10.

In Fig. 3 the pick-up head will be seen to comprise a single lamination core 7 with its ends overlapping and separated by a narrow space which forms gap 9.

In equipment according to the second embodiment of the invention the aim is to eliminate the time lag between the feed-back signal and the signal in the amplifier at the point of introducing the feed-back.

This equipment uses as a source of feed-back a signal from the magnetised particles of the recording medium whilst they are still in the recording air gap, a hybrid type of recording head being employed.

A schematic of one arrangement for carrying out this proposal is shown in Fig. 4.

A recording amplifier 11 feeds the two coils 12 and 13 of the special recording head to be described below. The third coil 14 on the same head is arranged so as to pick up signals from the reverse magneto-motive force of the magnetised recording medium, and, to a lesser extent stray signals from 12 and 13. The output of coil 14 is amplified and applied as negative feed-back to the input of the recording amplifier, through a filter 15 and a feed-back amplifier 16.

In Fig. 5 the core 17 will be seen to have three limbs, two outer crooked limbs 18 and 19, and a central straight limb 20, carrying coils 12, 14 and 13 respectively. The limbs 18 and 19 are separated at one end of each from limb 20 by two air gaps 21 and 22. The two air gaps are magnetically identical, but 21 is underflush compared with 22 which is the gap past which the recording medium is drawn. The coils 12 and 13 are fed from the recording amplifier. The magnetic flux due to 12 and 13 circulates through the outer limbs 18 and 19 leaving only stray flux to link coils 14 on the central limb 20. The stray flux can be reduced to a minimum by adjustment of potentiometers 23 and 24, shunting coils 12 and 13 respectively. By analogy with hybrid repeating coils, coil 14 can be expected to link a stray flux 40 dbs or more below the flux in the coils 12 and 13.

Gap 21 is included solely to make the system symmetrical and it does not participate in the recording process.

When recording the recording medium 4 will pass across gap 22 and any individual magnetic particle will be magnetised initially by the slight stray field which precedes the physical leading edge of the gap. It therefore enters the gap as a magnetised particle and will produce a magnetic flux in the magnetic circuit surrounding the gap 22 between limbs 19 and 20. As this flux changes the coil 14 will generate a voltage proportional to the state of magnetism produced in the recording medium. In order to be of any practical use as a source of negative feed-back this last voltage must be larger than that induced in 14 by the stray fields from 12 and 13.

Assuming that the iron oxide powder $Fe_3O_4$ is used as the magnetic element in the recording medium the voltage in coil 14 due to the recorded signal will be of the order 18 dbs greater than the stray induced voltage from coils 12 and 13. We have then a voltage originating from the recorded impression on the recording medium, in phase with the output from the recording amplifier, which when fed back in negative phase to the input of the recording amplifier will counteract the distortion produced in the magnetising process.

The third embodiment of the invention is equipment comprising means for synthesizing the distortion introduced in the recording process.

The distortion in the recorded signal on a magnetic medium is due, to a very large extent, to the non-linearity of the hysteresis cycle. If a transformer is constructed, using a core of the same magnetic material as that used for the recording medium, distortion in the output wave form would be closely related to that obtained in magnetic recording. Theoretically this similarity can be shown, the most important difference being that the transformer wave form is the differential of the magnetic recorder wave form.

Referring now to Figure 6 it will be seen that part of the output of the recording amplifier 11 is fed to one winding 25 of a transformer 26 using a core of the same permanent magnetic dust as that used in the recording medium. The maximum amplitudes of flux occurring in the core are limited to low values so that the material is never operated beyond the upper knee of the magnetisation curve.

The secondary winding 27 of the transformer feeds via a filter 28 into an integrating amplifier 29, inserted to compensate for differentiation by the transformer, at the output of which a signal is obtained containing harmonics substantially in the same ratio as those produced in the recording process. By feeding the output of the integrating amplifier 29 to the input of the recording amplifier through a phase adjuster 30, to carry out any necessary phase correction, the resulting negative feed-back will cause a reduction in the recording harmonics. If high frequency bias is to be used, such bias must be applied at the same frequency (30 to 100 kc./s. for instance), both to the recording head and the transformer so that by suitable adjustment the magnetic cores of both are worked over similar hysteresis cycles.

In Fig. 6 a high frequency bias oscillator 31 feeds into the recording head via connections 32, 33 and terminals 34 and 35 via an attenuator shown as a variable resistance 36, and to a winding 37 on transformer 26 via connections 38 and an attenuator shown as a variable resistance 39. The levels of bias signal in recording head and transformer are equalised by adjustment of 36 and 39.

Band stop filter 40, the stop band including the bias frequency, is inserted between the amplifier connection to winding 25 of transformer 26, on the one hand and to the recording head on the other hand to prevent any bias currents feeding back from the transformer into the amplifier output which might be out of phase with the direct bias from the H. F. bias oscillator 31.

The low pass filter 28 in the feed-back path prevents H. F. bias from reaching the negative feed-back input point in the amplifier and can also have a cut off frequency such as to prevent the feeding back of any frequencies which might cause instability in the feed-back loop. This also applies to filter 15 in Fig. 4.

What is claimed is:

1. Magnetic sound recording equipment comprising a recording head to which intelligence carrying signals are fed, a magnetic pickup unit positioned in close proximity to said head and including a core and a pick-up coil associated therewith, means, including said pick-up for generating negative feed-back signals having substantially the wave shape of the said intelligence signals as distorted by the recording medium and means for feeding the said negative feed-back signals together with said intelligence signals to the recording head whereby inherent distortion due to non-linearity in the magnetisation of the said medium is substantially reduced or eliminated.

2. Magnetic sound recording equipment comprising a recording head fed with intelligence carrying signals, a pick-up head a short distance from the recording head and past which a recording medium is drawn subsequent to passing the recording head, a phase-advancing network to which signals from the said pick-up head are fed and from which negative feed-back signals having substantially the wave shape of the said intelligence signals as distorted by the recording medium are fed to the recording head whereby inherent distortion due to non-linearity in the magnetisation of the said medium is substantially reduced or eliminated.

3. Magnetic sound recording equipment comprising a hybrid recording head including a substantially closed core provided with a gap, means for feeding a recording medium past said gap in close proximity therewith, said head having a plurality of series-connected windings to which intelligence-carrying signals are fed, an additional winding on the said recording head in which electric currents flow as a result of reverse magneto-motive force from the recording medium and a connection between the said additional winding and the input of the said series-connected windings for negative feed-back signals corresponding to the said intelligence signals as distorted by the recording medium whereby inherent distortion due to non-linearity in the magnetisation of the said medium is substantially reduced or eliminated.

4. Magnetic sound recording equipment as claimed in claim 2, in which the said pick-up head comprises a single lamination core.

5. Magnetic sound recording equipment as claimed in claim 3 in which the said hybrid recording head has three limbs, on the outer of which are the said series-connected windings and on the centre one of which is wound the said additional winding, and in which the stray magnetic flux due to currents in the series-connected windings which links the said additional winding is reduced by adjustable potentiometers shunting the said windings on the outer limbs.

6. Magnetic sound recording equipment as claimed in claim 4, and comprising a high frequency bias supply and a third winding on the said transformer, the said supply being fed both to the recording head and to the said third winding.

7. Apparatus for magnetically recording intellectual data on an elongate recording medium of electromagnetic material including in combination, a recording head comprising a substantially closed core of electromagnetic material provided with a gap and having electromagnetic properties identical to those of the material of said medium, said core being provided with a pair of opposed windings adapted to receive said intellectual data in the form of modulated signals to establish a varying magnetic field for magnetization of said recording medium, a third winding adapted to pick up distortion components initiated by the passage of said recording medium past said gap, and negative feedback means associated with said third winding and including integrating and frequency adjusting networks for modulating said intellectual data signals in a manner to balance out said distortion components during magnetization of said recording medium by said signals.

8. The device of claim 7 including a high frequency bias supply and means for feeding said supply to both said third winding and to said pair of windings.

9. The device of claim 7 including adjustable attenuators disposed between the source of intellectual data signals and said paired windings and between said third winding and said negative feedback means and a high frequency bias supply fed to both said paired windings and to said third winding, whereby the level of said signal is equalized by said attenuators.

10. Magnetic sound recording equipment comprising a magnetic recording medium, means for magnetically recording signals on said medium, said medium having inherent magnetic non-linearity whereby signals recorded thereon are distorted, means for generating other signals having substantially the same distortion as said recorded signals and means for feeding said other signals to said recording means in a negative feedback sense with respect to said recorded signals.

11. Magnetic sound recording equipment comprising a magnetic recording medium, an amplifier for amplifying signals to be recorded, means connected to said amplifier and associated with said medium for magnetically recording signals on said medium, said medium having inherent magnetic non-linearity whereby signals recorded thereon are distorted, means for generating other signals having substantially the same distortion as said recorded signals and means for connecting said generating means to said amplifier in a negative feed-back sense with respect to the signals amplified by said amplifier and recorded on said medium.

MICHAEL LAWRENCE GAYFORD.
WILLIAM DONALD CRAGG.

References Cited in the file of this patent

UNITED STATES PATENTS

| Number | Name | Date |
|---|---|---|
| 2,400,953 | Roys | May 28, 1946 |
| 2,513,653 | Kornei | July 4, 1950 |

FOREIGN PATENTS

| Number | Country | Date |
|---|---|---|
| 547,082 | Great Britain | Aug. 12, 1942 |
| 693,664 | Germany | July 16, 1940 |